(12) United States Patent
Boardman

(10) Patent No.: US 8,610,041 B1
(45) Date of Patent: Dec. 17, 2013

(54) MISSILE TRACKING BY GPS REFLECTIONS

(75) Inventor: Jonathan A. Boardman, Mount Laurel, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 190 days.

(21) Appl. No.: 13/113,487

(22) Filed: May 23, 2011

(51) Int. Cl.
*F41G 7/22* (2006.01)
*F42B 15/01* (2006.01)
*F41G 7/00* (2006.01)
*F42B 15/00* (2006.01)

(52) U.S. Cl.
USPC ............ 244/3.19; 244/3.1; 244/3.15; 342/61; 342/62; 342/175; 342/195; 342/350; 342/351; 701/400; 701/408; 701/468

(58) Field of Classification Search
USPC .......... 244/3.1–3.3; 89/1.11; 701/1, 3, 4, 400, 701/408, 467, 468; 342/25 R–25 F, 61–68, 342/104–115, 118, 146, 147, 175, 192–197, 342/350, 352, 357.2, 357.21, 357.22, 342/357.25, 357.31, 357.32, 357.39, 357.4, 342/357.51, 357.52, 357.61, 351
See application file for complete search history.

(56) References Cited

U.S. PATENT DOCUMENTS

| | | | | |
|---|---|---|---|---|
| 5,187,485 | A * | 2/1993 | Tsui et al. | 342/357.61 |
| 5,260,709 | A * | 11/1993 | Nowakowski | 342/62 |
| 5,280,294 | A * | 1/1994 | Hammerquist | 342/453 |
| 5,344,105 | A * | 9/1994 | Youhanaie | 244/3.14 |
| 5,473,331 | A * | 12/1995 | Kennedy et al. | 342/62 |
| 5,949,364 | A * | 9/1999 | Katzberg et al. | 342/25 A |
| 6,150,979 | A * | 11/2000 | Tsui | 342/357.61 |
| 6,232,922 | B1 * | 5/2001 | McIntosh | 342/453 |
| 6,256,559 | B1 * | 7/2001 | Tsui | 701/4 |
| 6,300,898 | B1 * | 10/2001 | Schneider et al. | 342/357.61 |
| 6,489,922 | B1 * | 12/2002 | Lin et al. | 342/357.32 |
| 6,522,295 | B2 * | 2/2003 | Baugh et al. | 342/453 |
| 6,549,165 | B2 * | 4/2003 | Neira et al. | 342/462 |
| 6,639,553 | B2 * | 10/2003 | Lin et al. | 342/357.52 |
| 6,666,401 | B1 * | 12/2003 | Mardirossian | 244/3.11 |
| 6,700,527 | B1 * | 3/2004 | Martin et al. | 342/25 R |
| 6,744,408 | B1 * | 6/2004 | Stockmaster | 342/453 |
| 6,806,823 | B1 * | 10/2004 | Smith et al. | 342/62 |
| 6,917,784 | B2 * | 7/2005 | Martin et al. | 342/192 |
| 6,930,638 | B2 * | 8/2005 | Lloyd et al. | 342/453 |
| 6,952,179 | B1 * | 10/2005 | Jones | 342/62 |
| 7,121,502 | B2 * | 10/2006 | Krikorian et al. | 244/3.14 |
| 7,155,240 | B2 * | 12/2006 | Atkinson et al. | 342/450 |
| 7,486,224 | B2 * | 2/2009 | Ghaleb et al. | 342/357.52 |
| 7,492,314 | B2 * | 2/2009 | DiEsposti et al. | 342/357.61 |
| 7,710,313 | B2 * | 5/2010 | Ghaleb et al. | 342/356 |
| 7,973,716 | B2 * | 7/2011 | Elwell et al. | 342/453 |
| 8,120,526 | B2 * | 2/2012 | Holder | 342/62 |
| 8,179,310 | B2 * | 5/2012 | Westphal | 342/357.4 |
| 8,279,119 | B2 * | 10/2012 | Elwell et al. | 342/453 |

\* cited by examiner

*Primary Examiner* — Bernarr Gregory

(74) *Attorney, Agent, or Firm* — Howard IP Law Group, PC

(57) ABSTRACT

A system for engaging hostile air or space threats with a defensive missile, where the defensive missile comprises an antenna for receiving global positioning system (GPS) signals. A global positioning system receiver is coupled to said antenna, for receiving global positioning system signals directly from global positioning system satellites and global positioning system signals reflected from the threat. A processing arrangement processes the direct and reflected global positioning system signals for determining the position and velocity of the threat. Vectoring controls are coupled to the processing arrangement, and are responsive to the location of the threat for directing the defensive missile toward the threat. In a particular embodiment, the antenna of the defensive missile is directionally controllable, and the defensive missile includes an antenna direction controller responsive to the processor for directing at least a beam of the antenna toward the threat.

8 Claims, 7 Drawing Sheets

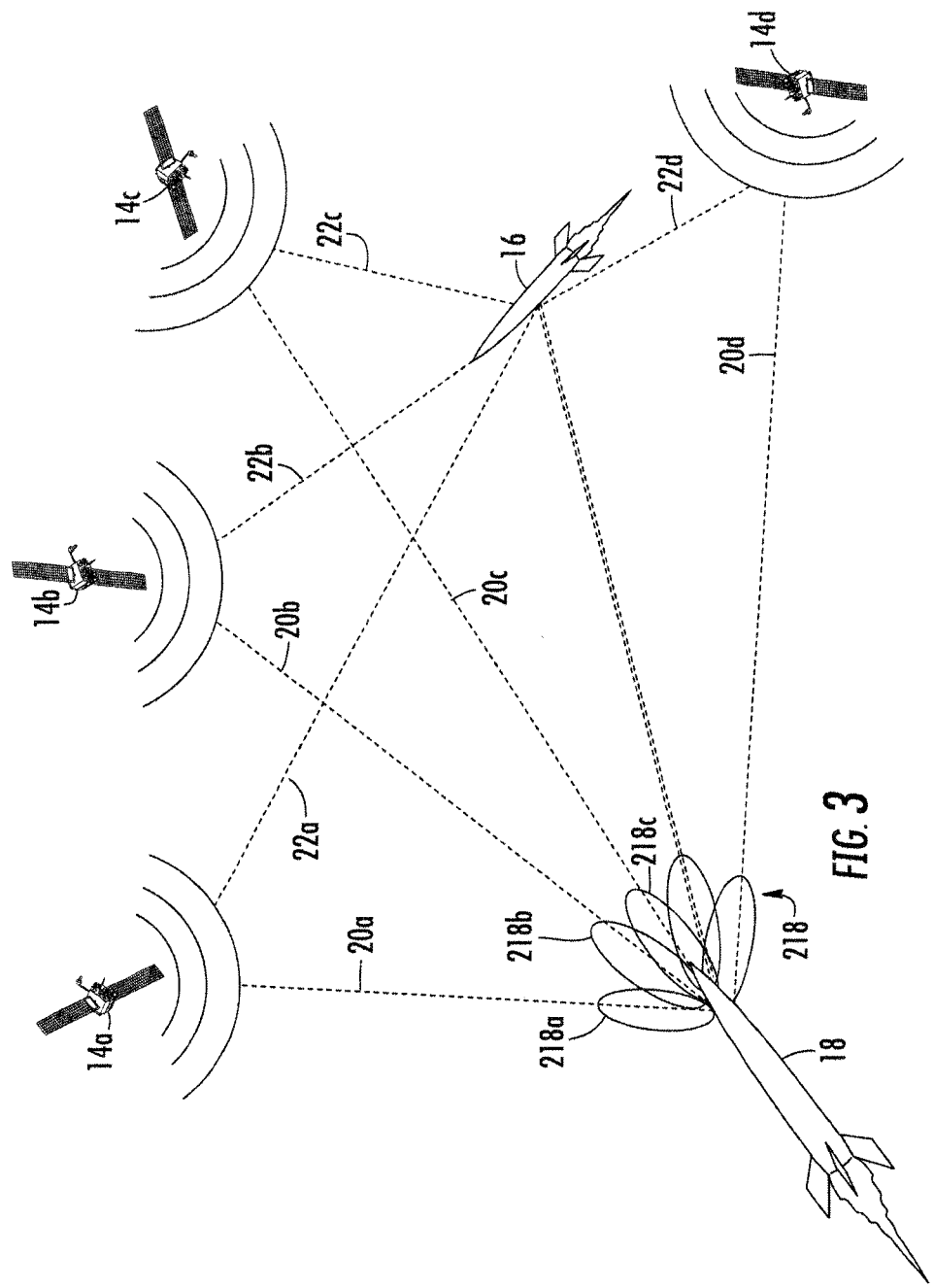

MISSILE TRACKING BY GPS REFLECTIONS

BACKGROUND

In the tracking and engagement of hostile air or space threats, the ability to estimate the target position and velocity with high accuracy is extremely important. Current tracking capabilities include the use of radar. However, additional, independent tracking sources are important for increased accuracy and tracking continuity. This is especially important in the case where the radar track is dropped or the radar track errors are too large to support accurate missile guidance.

Improved or alternative methods are desired for tracking and engaging hostile air or space threats.

SUMMARY

A defensive or anti-missile engagement system according to an aspect of the disclosure is for engaging a hostile air or space threat. The defensive system comprises a missile equipped with an antenna capable of receiving global positioning system (GPS) signals. A global positioning system receiver is coupled to the antenna, for receiving (a) global positioning system signals directly from global positioning system satellites and (b) global positioning system signals reflected from the hostile threat. A processing arrangement is provided for processing the direct and reflected global positioning system signals for determining the state (position and velocity) of the hostile threat. Vectoring controls are coupled to the processing arrangement, and are responsive to the state of the hostile threat for directing the defensive missile toward the hostile threat. In a particular embodiment, the antenna of the defensive missile is directionally controllable, and the defensive missile includes an antenna direction controller responsive to the processor for directing at least a beam of the antenna toward the hostile missile.

A method according to another aspect of the disclosure is for engaging an elevated target. The method comprises the steps of launching a defensive missile upon the approach of a hostile target, where the defensive missile includes a controllable antenna, which may be an array antenna, and also includes a global positioning system signal processor. The antenna and the global positioning system signal processor are activated. The global positioning system signals flowing directly from global positioning system satellites to the defensive missile are acquired and tracked. From the global positioning system signals flowing directly from global positioning system satellites a solution for the location of the defensive missile is determined. Global positioning system signals flowing from global positioning system satellites to the target, and reflecting from the target toward the defensive missile, are acquired and tracked. From the global positioning system signals flowing from global positioning system satellites to the target, and reflecting from the target toward the defensive missile, a solution for the state (position and velocity) of the target is obtained. The defensive missile is guided toward the target.

BRIEF DESCRIPTION OF THE DRAWINGS

FIG. 3 illustrates how the antenna beams of the defensive missile are directed in a scenario similar to that of FIG. 1;

DETAILED DESCRIPTION

Figure 1:
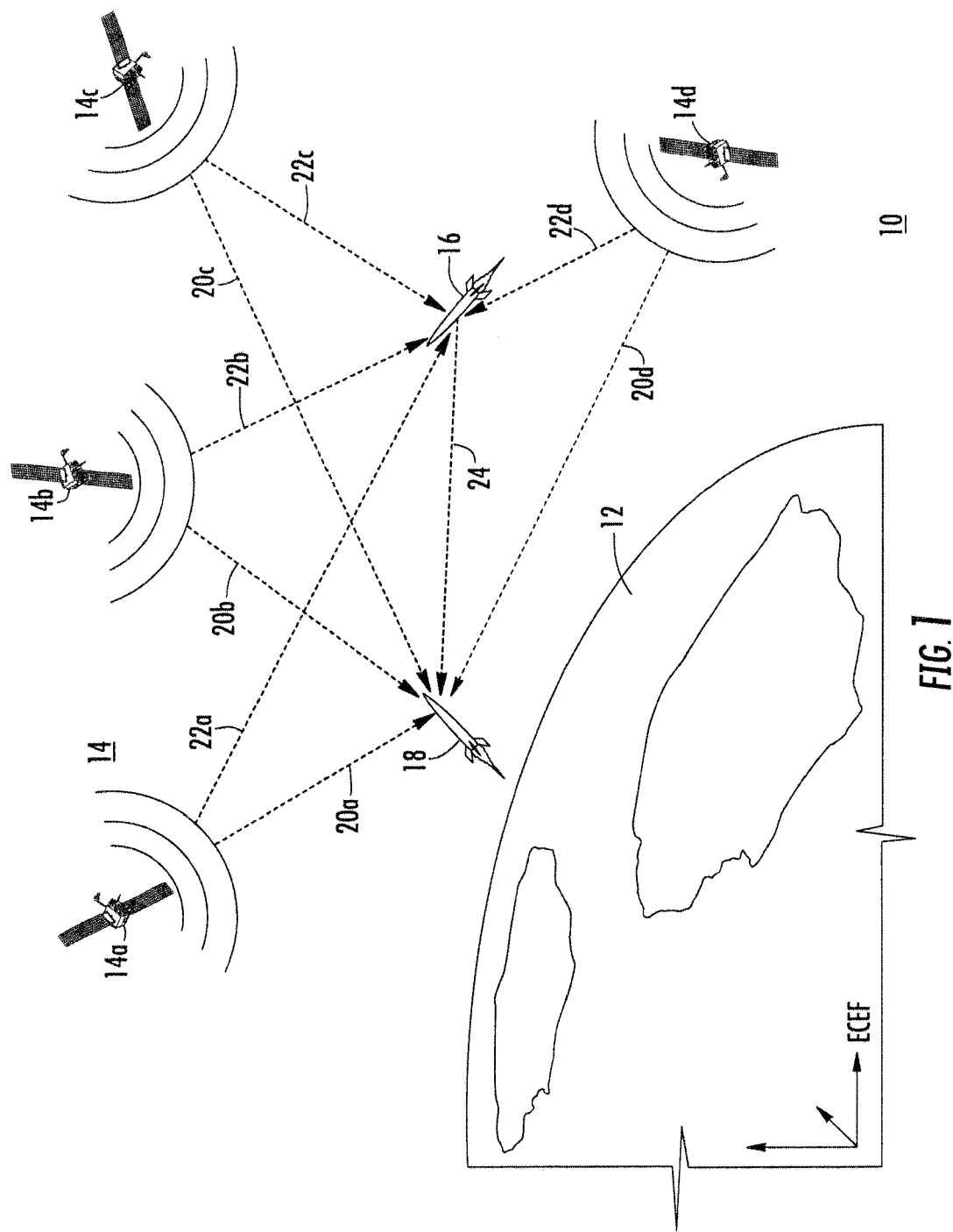
FIG. 1 illustrates a scenario in which a defensive or anti-missile missile receives GPS signals directly from GPS satellites and also receives GPS signals reflected from the target, which is a hostile missile.

In FIG. 1, a scenario 10 illustrates a portion 12 of the Earth's surface. First, second, third and fourth Global Positioning System (GPS) satellites 14a, 14b, 14c, and 14d, respectively, of a set 14 of satellites, orbit the Earth 12. Also illustrated in FIG. 1 are a hostile or target missile 16 and a defensive or anti-missile missile 18. In scenario 10, each GPS satellite transmits GPS signals. Some of the GPS signals transmitted by the GPS satellites, illustrated by dot-dash paths 20a, 20b, 20c, and 20d, are radiated toward and to the defensive missile 18. These direct-path signals provide a way for defensive missile 18 to identify its location using GPS techniques. Some of the signals transmitted by GPS satellites 14a, 14b, 14c, and 14d are radiated in other directions, as illustrated by dash lines 22a, 22b, 22c, and 22d, respectively, toward hostile missile 16. The GPS signals 22a, 22b, 22c, and 22d radiated by set 14 of GPS satellites are reflected by the body and other portions of hostile missile 16. A portion of those reflections, illustrated as a dash line 24, are in the direction of defensive missile 18.

Reflected signals 24 of FIG. 1 are illustrations of a phenomenon known as "multipath," by which signals from a given source arrive at a receiver by way of multiple paths. Thus, in FIG. 1, defensive missile 18 receives the GPS signals radiated by first satellite 14a by way of direct path 20a, and also by way of a reflected path including paths 22a and 24. Similarly, defensive missile 18 receives the GPS signals radiated by second, third and fourth satellites 14b, 14c, and 14d, respectively, by way of direct paths 20b, 20c, and 20d, and also by way of reflected path 24.

Figure 2A:
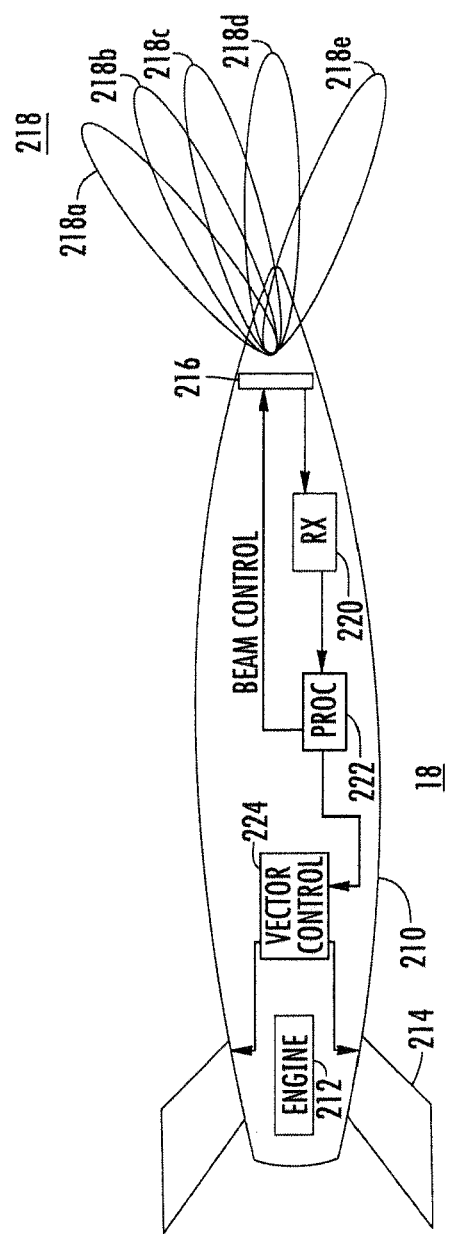
FIG. 2A is a simplified block diagram of the defensive missile, showing a controllable antenna, a processor for GPS system signal reception, for determining the location of the hostile missile, for commanding a vector control to direct the defensive missile toward the hostile missile, and for directing beams of the antenna in appropriate directions.

FIG. 2A is a simplified illustration of a defensive or interceptor missile 18 according to an aspect of the disclosure. In FIG. 2A, missile 18 includes a body 210 with an engine or thruster 212 and flight direction or vectoring controls illustrated as vanes 214. Missile 18 includes a nose-mounted controllable antenna 216 which receives direct and reflected GPS signals by way of one or more beams 218a, 218b, 218c, 218d, and or 218e. These signals are routed to a receiver (RX) illustrated as a block 220. Receiver 220 receives analog signals, amplifies and processes the analog signals to produce baseband or intermediate-frequency (IF) signals containing the GPS navigation information. The received signal is routed from receiver 220 to a processor 222. Processor 222 performs most of the processing associated with GPS navigation of defensive missile 18, location of the hostile missile 16, control of the beams and beam directions of antenna 216, and control of the vectoring vanes to direct the defensive missile toward the hostile missile. As known, the processing performed by processor 222 may be spread among a plurality of separate processors.

GPS receivers track both code phase and carrier phase signals from GPS satellites. These signals are decoded into range and delta-range information. There are various sources of error which corrupt these measurements. They include signal delay due to the troposphere, signal advance due to the ionosphere, receiver clock bias, satellite ephemeris error, receiver noise, and multipath. Most of these errors can be corrected or ameliorated using differential techniques. Receiver noise can be smoothed using a low-pass filter. Multipath is one of the main causes of error for high-accuracy navigation. As mentioned, multipath is caused by GPS signals arriving at the receiver by way of paths other than a direct line-of-sight from the satellite to the receiver, including reflections from nearby objects. To decode the GPS signal for GPS navigation, the receiver generates an internal signal and correlates the internal signal with the measurements. The multipath or reflected signals tend to disrupt the receiver's correlation processing, and thereby result in code phase and carrier phase measurement errors. Techniques are known for mitigation of multipath errors in ordinary GPS navigation. These techniques include modeling and filtering multipath errors and using spatial processing to perform antenna beamforming to increase the GPS system gain in the direction of the direct signals and to reduce gain in the direction of the reflected signals.

While multipath signals are ordinarily a source of navigation error, they may be useful in certain contexts. For example, in the case of intercepting a target hostile air or space threat, including a ballistic missile, GPS multipath signals reflected from the target can be used to assist in locating and tracking the target 16 by a receiver aboard the defensive or intercepting missile 18. This is accomplished by modeling and solving for the multipath errors, or tracking the reflected signals separately. This technique can be used independently to passively locate a target, using only GPS signals already present in the environment, or it can be used in conjunction with other locating and tracking methods, such as radar or infrared imaging.

Figure 2B:
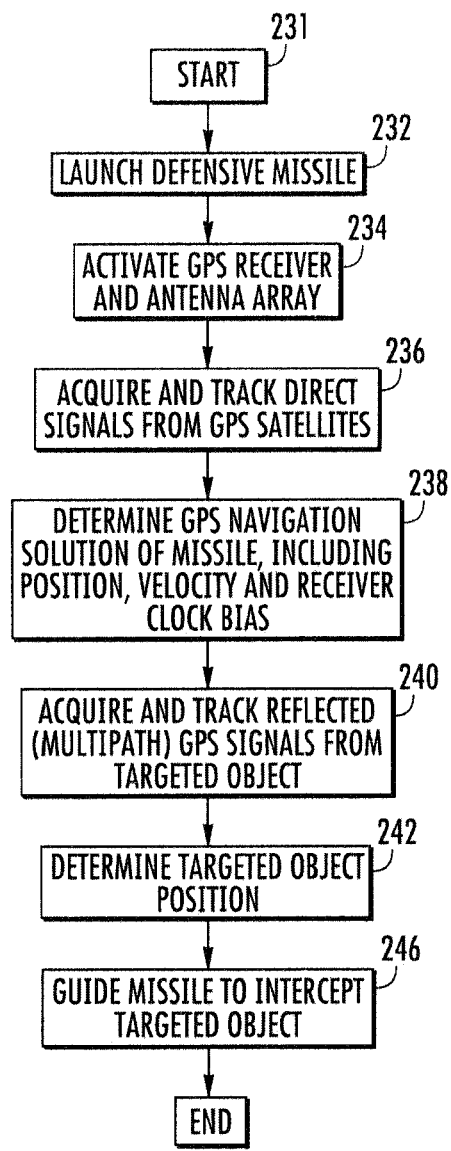
FIG. 2B is a logic or control flow chart or diagram illustrating the processing steps required to direct the antenna beams, to identify the various GPS signals, and determine the location of the target missile.

In general, the method of the disclosure is described in conjunction with the flow chart or diagram of FIG. 2B. In FIG. 2B, the logic begins at a START block 231 and flows to a block 232, which represents the launching of the defensive missile 18 of FIG. 1. This will ordinarily be in response to the detection of the approach of a hostile missile such as 16. The global positioning system (GPS) portion of the processor 222 of the defensive missile 18 of FIG. 1 and the antenna 216 are activated, as suggested by block 234. The direct signals from the GPS satellites are acquired and tracked, as suggested by block 236, and a GPS navigation solution is obtained for the defensive missile, as indicated by block 238. This navigation solution includes defensive missile position, velocity, and receiver clock bias. Block 240 represents acquisition and tracking of the reflected or multipath signals reflected from the hostile missile toward the defensive missile. Block 242 represents determination of the position or location, and velocity, of the hostile missile or target 16. Block 246 represents guidance of the defensive missile 18 toward the hostile missile or target 16.

Figure 2C:
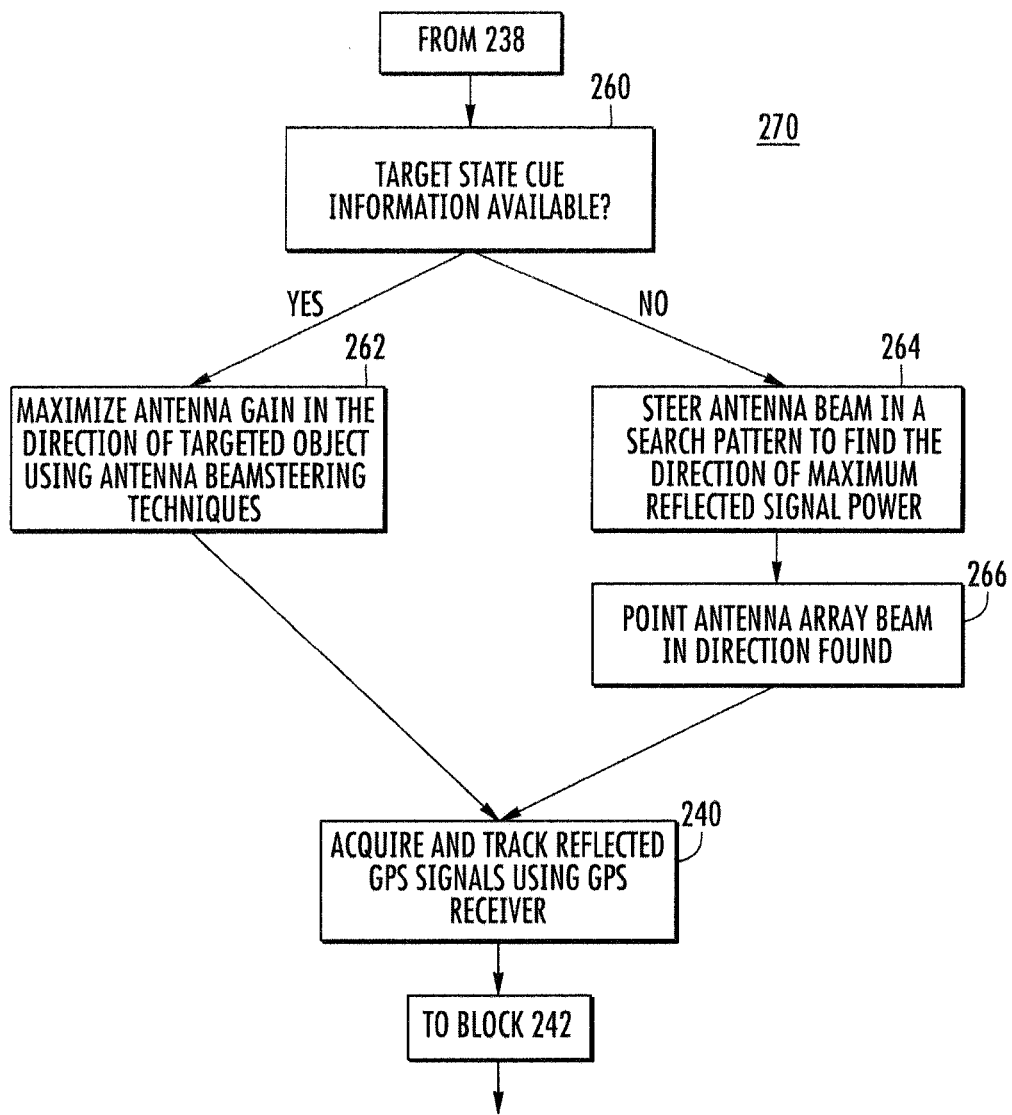
FIG. 2C illustrates details of the processing of FIG. 2B.

FIG. 2C is a simplified logic flow chart or diagram illustrating details of the processing of block 270 of FIG. 2B. In FIG. 2C, the logic flows from block 238 to a decision block 260. Decision block 260 determines whether target cue information is available. Such information might include a location reported by a remote sensor, a radar system, or the like. If cue information is available, the logic 270 leaves decision block 260 by the YES output, and flows to a block 262. Block 262 represents the maximizing of the gain of the antenna (216 of FIG. 2A) in the direction of the targeted object. This is easily accomplished by the use of conventional beamsteering techniques. If cue information is not available, the logic 270 leaves decision block 260 by the NO output, and arrives at a block 264. Block 264 represents the steering of the antenna beam(s) in a search pattern to find the direction of maximum reflected signal power. Block 266 represents the pointing of an antenna beam in the direction of maximum reflected power. From either block 262 or block 266, the logic 270 flows to block 240, which represents acquisition and tracking of the GPS signal(s) reflected from the hostile target. From block 268, logic 270 of FIG. 2C flows to block 242 of FIG. 2B.

FIG. 3 is a simplified representation of a scenario showing the adjustment of the beam pattern 218 of the defensive missile 18 as described by block 264 and 266 of FIG. 2B. Elements of FIG. 3 corresponding to those of FIG. 1 or 2A are designated by like reference alphanumerics. As illustrated in FIG. 3, the search beam pattern may include the generation of annular beams defining an included angle between the main lobes of the various annular beams, or possibly a single axial lobe 218c. As shown in FIG. 3, pattern 218a may include a beam maximum directed toward first satellite 14a. The pattern 218 of beams may be varied over time so as to scan over a hemisphere or a semisphere (a portion of a sphere), and to receive signals from all objects within the hemi or semisphere.

Figure 4:
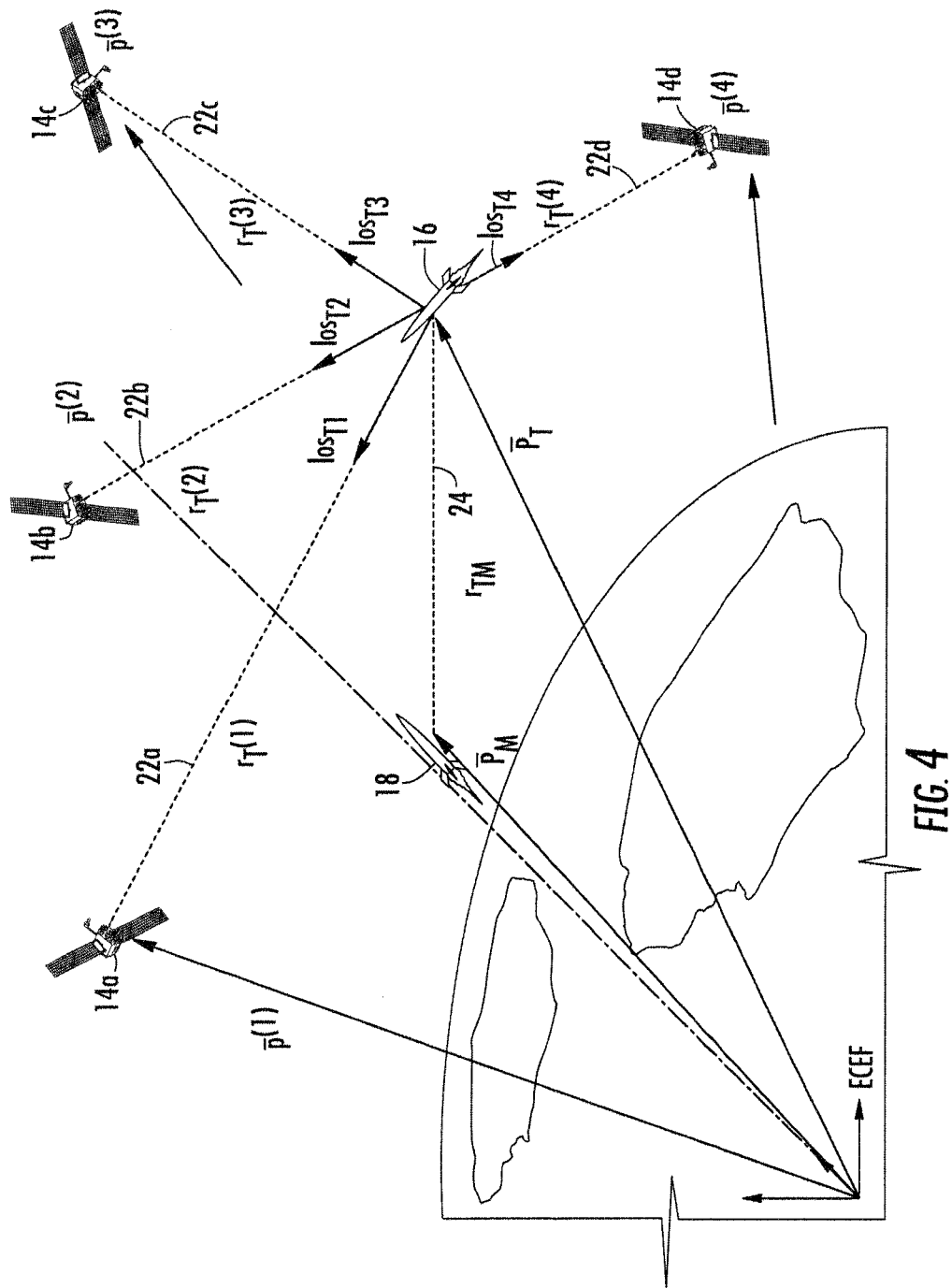
FIG. 4 details geometrical aspects of the engagement of the hostile missile in a scenario similar to that of FIG. 1.

In general, the targeted object position is calculated using the reflected GPS signals. Once the GPS receiver onboard the missile (a part of processor 222 of FIG. 2A) acquires GPS satellites and formulates its own navigation solution (blocks 236 and 238), the pseudorange measurements due to reflected GPS signals can be isolated, blocks 240. The targeted object position is solved for, referring to FIG. 4. In FIG. 4, elements corresponding to those of FIG. 1 are designated by like reference numerals. FIG. 4 also illustrates an Earth-center Earth-fixed (ECEF) vector $\vec{p}^{(1)}$ extending from the Earth's center to the first satellite 14a, a vector $\vec{p}^{(2)}$ extending from Earth center 8 to second satellite 14b, a vector $\vec{p}^{(3)}$ extending from Earth center 8 to third satellite 14c, a vector $\vec{p}^{(4)}$ extending from Earth center 8 to fourth satellite 14d, a vector $\vec{p}_M$ extending from Earth center 8 to the defensive missile 18, and a vector $\vec{p}_T$ extending from Earth center 8 to the target missile. Additional designations are applied to various lines. Line 22a is designated range of satellite 1 to target ($r_T^{(1)}$) along the target-to-satellite-1 line-of-sight ($\text{los}_{T1}$), line 22b is designated range of satellite 2 to target ($r_T^{(2)}$) along the target-to-satellite-2 line-of-sight ($\text{los}_{T1}$), line 22c is designated range of satellite 3 to target ($r_T^{(3)}$) along the target-to-satellite-3 line-of-sight ($\text{los}_{T3}$), and line 22d is designated range of satellite 4 to target ($r_T^{(4)}$) along the target-to-satellite-4 line-of-sight ($\text{los}_{T4}$).

With the defensive missile position and other errors including onboard receiver clock bias already known from the standard GPS solution (block 238 of FIG. 2C), the pseudorange measurement due to multipath can be isolated. This corresponds to block 268 of FIG. 2C. The pseudorange $\rho_{mp}^{(k)}$ due to multipath from a satellite k can be modeled as the range from satellite k to the target, plus the range from the target to the missile.

$$\rho_{mp}^{(k)} = \|\vec{p}_T - \vec{p}^{(k)}\| + \|\vec{p}_T - \vec{p}_M\| = r_T^{(k)} + r_{TM} \quad (1)$$

where $\vec{P}_T = [X_T y_T Z_T]^T$ is the position of the targeted object to be solved for, $\vec{P}_M = [x_M y_M z_M]^T$ is the known position of the missile, $\vec{p}^{(k)} = [x^{(k)} y^{(k)} z^{(K)}]^T$ is the position of satellite k, $r_{TM}$ is the range from the targeted object to the missile and $r_T^{(k)}$ is the range from the targeted object to satellite k. Equation 1 can be written out as shown below in Equation 2.

$$\rho_{mp}^{(k)} = \sqrt{(x_T - x^{(k)})^2 + (y_T - y^{(k)})^2 + (z_T - z^{(k)})^2} + \sqrt{(x_T - x_M)^2 + (y_T - y_M)^2 + (z_T - z_M)^2} \quad (2)$$

This is a non-linear equation with three unknowns. Since the pseudoranges contain the range from the satellite to the target and the range from the target to the defensive missile, the measurements are ambiguous. Therefore a fourth unknown must be added to the state, namely the range from the target to the defensive missile, $r_{TM}$. This range is the same for measurements from all satellites. One equation in the form of Equation 2 will be available for each satellite. In order to obtain a solution, this set of equations can then be linearized using well-known differential techniques. This results in Equations 3 or 4, below.
or $$\delta \vec{\rho}_{mp} = \begin{bmatrix} -los_{T1}^T & 1 \\ -los_{T2}^T & 1 \\ \vdots & \vdots \\ -los_{TK}^T & 1 \end{bmatrix} \begin{bmatrix} \delta \vec{p}_T \\ \delta r_{TM} \end{bmatrix} \quad (3)$$

$$\delta \vec{\rho}_{mp} = G \begin{bmatrix} \delta \vec{p}_T \\ \delta r_{TM} \end{bmatrix} \quad (4)$$

where $-los_{T(k)}^T$ is the negative transpose of the line-of-sight unit vector from the targeted object to satellite k, $\delta \vec{p}_T$ is a differential increment to the targeted object position estimate, $\delta r_{TM}$ is a differential increment to the missile-target range and $\delta \vec{\rho}_{mp}$ is the difference between the estimated and measured multipath pseudoranges.

The target state contains four unknowns, so the presence of at least four satellites is required for a solution. The state can be solved for by using a least squares approach. Because the equations have been linearized, the solution must be obtained iteratively. The iterative steps are illustrated in the flow chart or diagram of FIG. 5. The logic of FIG. 5 begins at a START block 631, and flows to a block 632. Block 632 represents the formation of a guess or estimate of the state of the target or hostile missile 16. The state may be initialized to all zeros.

$$\begin{bmatrix} \hat{p}_T \\ \hat{r}_{MT} \end{bmatrix} = \begin{bmatrix} 0 \\ 0 \\ 0 \\ 0 \end{bmatrix} \quad (5)$$

For a set number of iterations determined by block 644, the steps of blocks 634 through 642 are performed.
The total range of each reflected signal is estimated in block 634;

$$\begin{bmatrix} \rho_{mp}^{(1)} \\ \rho_{mp}^{(2)} \\ \vdots \\ \rho_{mp}^{(K)} \end{bmatrix} = \begin{bmatrix} \|\hat{p}_T - \vec{p}^{(1)}\| + \|\hat{p}_T - \vec{p}_M\| \\ \|\hat{p}_T - \vec{p}^{(2)}\| + \|\hat{p}_T - \vec{p}_M\| \\ \vdots \\ \|\hat{p}_T - \vec{p}^{(K)}\| + \|\hat{p}_T - \vec{p}_M\| \end{bmatrix} \quad (6)$$

Measured multipath pseudoranges are compared to estimated ranges in block 636;

$$\begin{bmatrix} \delta \rho_{mp}^{(1)} \\ \delta \rho_{mp}^{(2)} \\ \vdots \\ \delta \rho_{mp}^{(K)} \end{bmatrix} = \begin{bmatrix} \rho_{measured}^{(1)} & \rho_{mp}^{(1)} \\ \rho_{measured}^{(2)} & - & \rho_{mp}^{(2)} \\ \vdots & & \vdots \\ \rho_{measured}^{(K)} & & \rho_{mp}^{(K)} \end{bmatrix} \quad (7)$$

where $\rho_{measured}^{(k)}$ is the measured multipath pseudorange from satellite k.
The G matrix is formed in block 638;

$$G = \begin{bmatrix} \left(\hat{p}_T - \vec{p}^{(1)}\right)^T / \|\hat{p}_T - \vec{p}^{(1)}\| & 1 \\ \left(\hat{p}_T - \vec{p}^{(2)}\right)^T / \|\hat{p}_T - \vec{p}^{(2)}\| & 1 \\ \vdots & \vdots \\ \left(\hat{p}_T - \vec{p}^{(K)}\right)^T / \|\hat{p}_T - \vec{p}^{(K)}\| & 1 \end{bmatrix} \quad (8)$$

Figure 5:
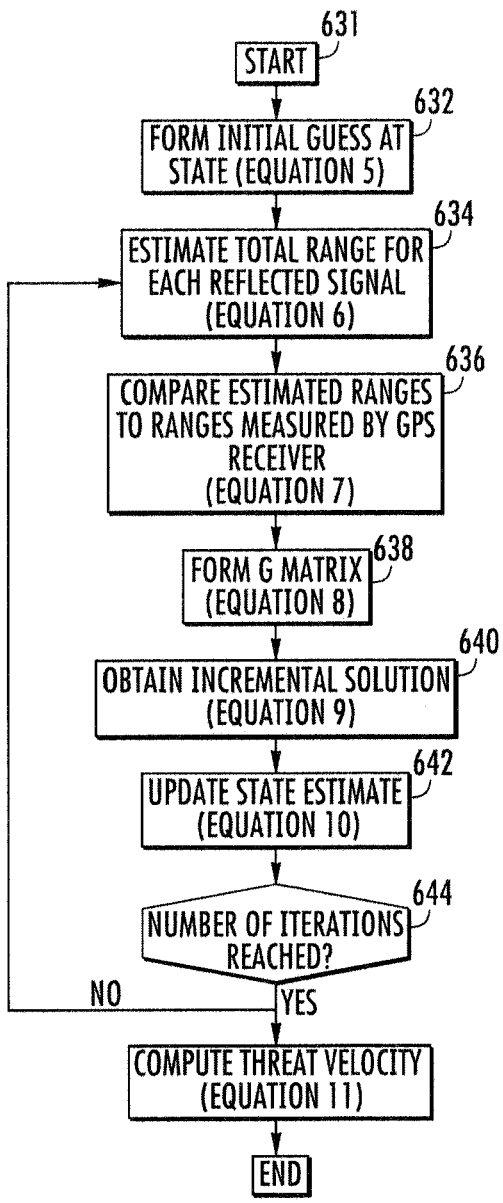
FIG. 5 details how the position of the targeted object is determined given the tracking of the reflected GPS signals.

The incremental least-squares solution is obtained in block 640;

$$\begin{bmatrix} \delta \vec{p}_T \\ \delta r_{MT} \end{bmatrix} = (G^T W^{-1} G)^{-1} G^T W^{-1} \delta \vec{\rho}_{mp} \quad (9)$$

where W is a weight matrix selected by the user.
The state estimate is updated in block 642;

$$\begin{bmatrix} \hat{p}_T \\ \hat{r}_{TM} \end{bmatrix}^+ = \begin{bmatrix} \hat{p}_T \\ \hat{r}_{TM} \end{bmatrix}^- + \begin{bmatrix} \delta \vec{p}_T \\ \delta r_{MT} \end{bmatrix} \quad (10)$$

where − indicates the current estimate and + indicates the updated estimate.
If number of iterations is reached, take the YES output of decision block 644, otherwise take the NO path and repeat from block 634, all as illustrated in FIG. 5.
If the number of iterations has been reached, the logic of FIG. 5 reaches block 645, which represents determination of the threat velocity using the solution of steps 634 through 644 together with range-rate or Doppler shift measurements from the GPS receiver;

$$\vec{v} = (G^T W^{-1} G)^{-1} G^T W^{-1} \dot{\rho} \quad (11)$$

where:
  $\vec{v}$ is the three-dimensional threat velocity; and
  $\dot{\rho}$ is a vector of observed range-rate or Doppler shift of the multipath range.

A method according to an aspect of the disclosure is for engaging an elevated target. The method comprises the step of launching a defensive missile upon the approach of a hostile target, where the defensive missile includes an antenna array and a global positioning system signal processor. The antenna and the global positioning system signal processor are activated. The global positioning system signals flowing directly from global positioning system satellites to the defensive missile are acquired and tracked. A solution for the location of the defensive missile is determined from the global positioning system signals flowing directly from the global positioning system satellites. Global positioning system signals flowing from global positioning system satellites to the target, and reflecting from the target toward the defensive missile are acquired and tracked. A solution for the state (position and velocity) of the target is generated from the global positioning system signals flowing from global positioning system satellites to the target, and reflecting from the target toward the defensive missile. The defensive missile is guided to intercept the target.

A defensive or anti-missile engagement system according to an aspect of the disclosure is for engaging a hostile air or space threat. The defensive system comprises a missile equipped with an antenna capable of receiving global positioning system (GPS) signals. A global positioning system receiver is coupled to the antenna, for receiving (a) global positioning system signals directly from global positioning system satellites and (b) global positioning system signals reflected from the hostile threat. A processing arrangement is provided for processing the direct and reflected global positioning system signals for determining the state (position and velocity) of the hostile threat. Vectoring controls are coupled to the processing arrangement, and are responsive to the state of the hostile threat for directing the defensive missile toward the hostile threat. In a particular embodiment, the antenna of the defensive missile is directionally controllable, and the defensive missile includes an antenna direction controller responsive to the processor for directing at least a beam of the antenna toward the hostile missile.

What is claimed is:

1. A system for engaging an air or space target, said system comprising:
   a missile equipped with an antenna capable of receiving global positioning system (GPS) signals;
   a global positioning system receiver coupled to said antenna, for receiving global positioning system signals directly from global positioning system satellites and global positioning system signals reflected from the target;
   a processing arrangement for processing said direct and reflected global positioning system signals for determining the state of the target; and
   vectoring controls coupled to said processing arrangement, and responsive to said state of the target for directing said missile toward the target.

2. A system according to claim 1, wherein:
   said antenna is capable of being controllably beamsteered; and
   said processing arrangement is coupled to said antenna for directing a beam of said antenna toward said position of said target.

3. A system according to claim 2, wherein said processing arrangement includes a cue signal function which responds to a target cueing signal for directing said beam of said antenna in the cue direction.

4. A system according to claim 2, wherein said processing arrangement includes a function responsive to a lack of a target cue signal, for scanning said beam over a region of space in a search pattern.

5. A system according to claim 1, wherein said antenna is directionally controllable, and said missile further includes an antenna beam direction controller coupled to said antenna and to said processing arrangement for directing a beam of said antenna generally toward said position of said target.

6. A system according to claim 1, wherein the state of the target comprises the position and velocity of the target.

7. A method for engaging an elevated target, said method comprising the steps of:
   launching a missile upon the approach of the target, said missile including an antenna array and a global positioning system signal processor;
   activating said antenna and said global positioning system signal processor;
   acquiring and tracking global positioning system signals flowing directly from global positioning system satellites to the missile;
   determining from said global positioning system signals flowing directly from the global positioning system satellites a solution for the location of said missile;
   acquiring and tracking global positioning system signals flowing from global positioning system satellites to the target, and reflecting from said target toward said missile;
   from said global positioning system signals flowing from global positioning system satellites to the target, and reflecting from said target toward said missile, generating a solution for the state of said target; and
   guiding said missile to intercept said target.

8. A method according to claim 7, wherein the step of generating a solution for the state of the target comprises generating a solution for the position and velocity of the target.

* * * * *